United States Patent [19]
Fujimori

[11] Patent Number: 6,034,723
[45] Date of Patent: Mar. 7, 2000

[54] IMAGE MOVEMENT VECTOR DETECTION APPARATUS

[75] Inventor: Yasuhiro Fujimori, Kanagawa, Japan

[73] Assignee: Sony Corporation, Tokyo, Japan

[21] Appl. No.: 08/153,916

[22] Filed: Nov. 17, 1993

[30]    Foreign Application Priority Data

Nov. 20, 1992   [JP]   Japan ................................. 4-312470

[51] Int. Cl.[7] ................................................ H04N 5/228
[52] U.S. Cl. ................................................................ 348/208
[58] Field of Search ................................. 348/345, 349, 348/352, 354, 362, 208

[56]         References Cited

U.S. PATENT DOCUMENTS

| | | | |
|---|---|---|---|
| 3,562,423 | 2/1971 | Murphy | 348/525 |
| 4,933,757 | 6/1990 | Kanno et al. | 248/71 |
| 5,198,896 | 3/1993 | Kondo et al. | 358/105 |
| 5,237,405 | 8/1993 | Egusa et al. | 358/105 |
| 5,259,040 | 11/1993 | Hanna | 382/107 |
| 5,267,034 | 11/1993 | Miyatake et al. | 348/352 |

*Primary Examiner*—Andrew I. Faile
*Assistant Examiner*—Andrew B. Christensen
*Attorney, Agent, or Firm*—Frommer Lawrence & Haug, LLP.; William S. Frommer

[57]          ABSTRACT

An image movement vector detection apparatus detects an image movement vector from an image signal produced by a video camera. The apparatus includes a vibration vector detector which detects a vibration vector from the image signal resulting from vibration of the video camera. An image movement vector detector detects an image movement vector representing movement of an object within the image signal based both on the image signal and the vibration vector.

23 Claims, 9 Drawing Sheets

IMAGE MOVEMENT VECTOR DETECTION APPARATUS

BACKGROUND OF THE INVENTION

The present invention relates to the detection of image movement vectors representing movement of objects within images represented by image signals.

It is often useful to employ techniques for detecting the movement of an object within an image for purposes such as video standards conversion and video signal compression.

As distinguished from image movement vector detection, a technique for compensating for the effects of video camera vibration is discussed in Japanese Patent Publication No. 63 166 370. In this vibration compensation technique, pixel data representing an image are divided into block areas within the image and a macro vector representing movement in each block is produced. If the same macro vector is detected in blocks which are relatively far apart within the image, these corresponding macro vectors are assumed to represent vibration and a vibration vector corresponding therewith is produced. Then the pixel data are shifted in accordance with the vibration vector to compensate for the vibration of the camera.

The problem of image movement vector detection is complicated by the presence of vibration components. That is, apparent object movement within an image can actually be caused by camera vibration and the apparent movement can be mistaken in the detection process for actual movement of the object, so that erroneous image movement vectors can be produced as a result of image vibration.

OBJECTS AND SUMMARY OF THE INVENTION

It is an object of the present invention to provide image movement vector detection apparatus which substantially alleviate the foregoing problems associated with image movement vector detection techniques.

A further object of the present invention is to provide camera apparatus in which accurate image movement vector detection enables improved adjustment of camera exposure time.

Another object of the present invention is to provide video camera apparatus for tracking moving objects by means of improved image movement vector detection techniques.

In accordance with an aspect of the present invention, an image movement vector detection apparatus for detecting an image movement vector from an image signal produced by a video camera is provided, the image movement vector representing movement of an object within an image represented by the image signal. The apparatus comprises: vibration vector detecting means for detecting a vibration vector from the image signal resulting from vibration of the video camera; and image movement vector detecting means for detecting an image movement vector representing movement of an object within the image signal based on both of the image signal and the vibration vector.

In accordance with another aspect of the present invention, a video camera for producing an image signal in response to a light image received thereby is provided. The video camera comprises: imaging means for producing an image signal from a light image by exposing the imaging means to the light image for a selectable exposure time; vibration vector detecting means for detecting a vibration vector from the image signal resulting from vibration of the video camera; image movement vector detecting means for detecting an image movement vector representing movement of an object within the image signal based on both the image signal and the vibration vector; and exposure time control means for setting the selectable exposure time of the imaging means based on the image movement vector.

In accordance with a further aspect of the present invention, a video camera for tracking a moving object imaged thereby is provided. The video camera comprises: imaging means for producing an image signal from a light image; vibration vector detecting means for detecting a vibration vector from the image signal resulting from vibration of the video camera; image movement vector detecting means for detecting an image movement vector representing movement of a moving object within the image signal based on both the image signal and the vibration vector; and servo means responsive to the image movement vector for adjusting a position of the video camera to track the moving object based on the image movement vector.

The above, and other objects, features and advantageous of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

DETAILED DESCRIPTION OF CERTAIN ADVANTAGEOUS EMBODIMENTS

Figure 1:
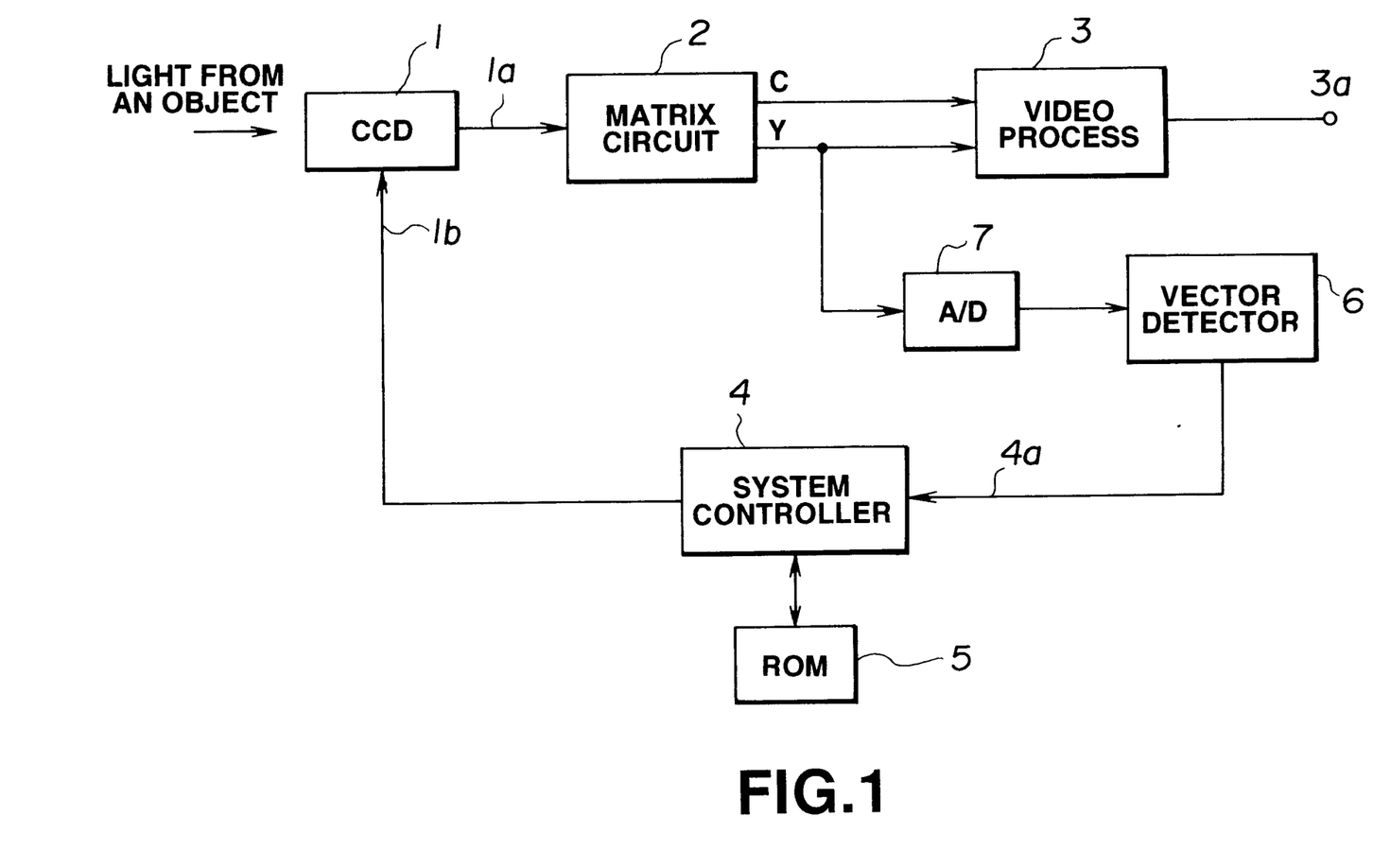
FIG. 1 is a block diagram of a video camera in accordance with an embodiment of the present invention.

With reference now to FIG. 1, a video camera for producing an image signal in response to a light image includes a CCD imaging device 1 which receives light from an object within the camera's image field. In response to the received light, the CCD imaging device 1 produces an image signal which it provides at an output 1a thereof. The device 1 produces the image signal by accumulating charges for a selectable exposure time and is provided with an electronic shutter function for selecting the exposure time in response to a control signal applied to a shutter control input terminal 1b thereof. It will be appreciated that the CCD imaging device 1 is only one type of imaging device that produces an image signal by exposure to light for a selectable exposure time. Other imaging devices suitable for use in the video camera of FIG. 1 will be readily apparent. For example, a saticon tube may be used with a mechanical shutter having a selectable exposure time. In addition a CCD imaging device may be exposed for a selectable time period with the use of a mechanical shutter in response to the control signal.

The output 1a of the imaging device 1 is coupled with an input of a matrix circuit 2 which serves to produce a luminance signal (Y) and a color signal (C) from the image signal received at its input. The matrix circuit 2 provides the color signal C at an output coupled with a first input of a video processing circuit 3 having a second input coupled with a second output of the matrix circuit 2 to receive the luminance signal Y. The video processing circuit 3 carries out necessary signal processing as required or desired for the particular application of the video camera, such as gamma correction, video encoding, recording signal processing and/or composite video signal production to provide a video output signal at an output 3a.

As noted above, CCD imaging device 1 accumulates charges in response to received light in order to produce an image signal. If a moving object is imaged by the device 1, or any similar device, an excessive accumulation time (that is, an excessive light exposure time) can result in a blurry image.

In the embodiment of FIG. 1, a system controller 4 provides an exposure time control signal to the control input 1b of the CCD imaging device 1 and also controls image signal readout therefrom. A read only memory (ROM) 5 stores accumulating time data which is accessed by the system controller 4 based on the movement of an object being imaged by the imaging device 1. That is, the accumulating time data stored in ROM 5 is selected to cause the system controller 4 to reduce the exposure time of the imaging device 1 for relatively larger amounts of object movement as need be to avoid producing a blurry image when reproduced. The movement of the object is represented by an image movement vector detected by means of an image movement vector detector 6 and supplied thereby to an input 4a of the system controller 4. The image movement vector detector 6 serves to detect the image movement vector based on digitized luminance data supplied by an analog-to-digital converter (A/D) 7 having an input coupled with the second output of the matrix circuit 2 to receive the luminance signal Y.

As an example, if a user wishes to take a still picture of another person as he or she swings a golf club, the vector detector 6 will serve to produce an image movement vector indicating the person's movement, so that the system controller 4 is able to adjust the accumulating time of the imaging device 1 accordingly to avoid producing a blurry picture. It will be appreciated that the embodiment of FIG. 1 is also useful for producing moving pictures, and that the same may be adapted for use in controlling the exposure time of a film camera to avoid producing a blurry image. That is, the image movement vector produced by the vector detector 6 may be used to control the timing of a film camera's shutter for this purpose.

Figure 2:
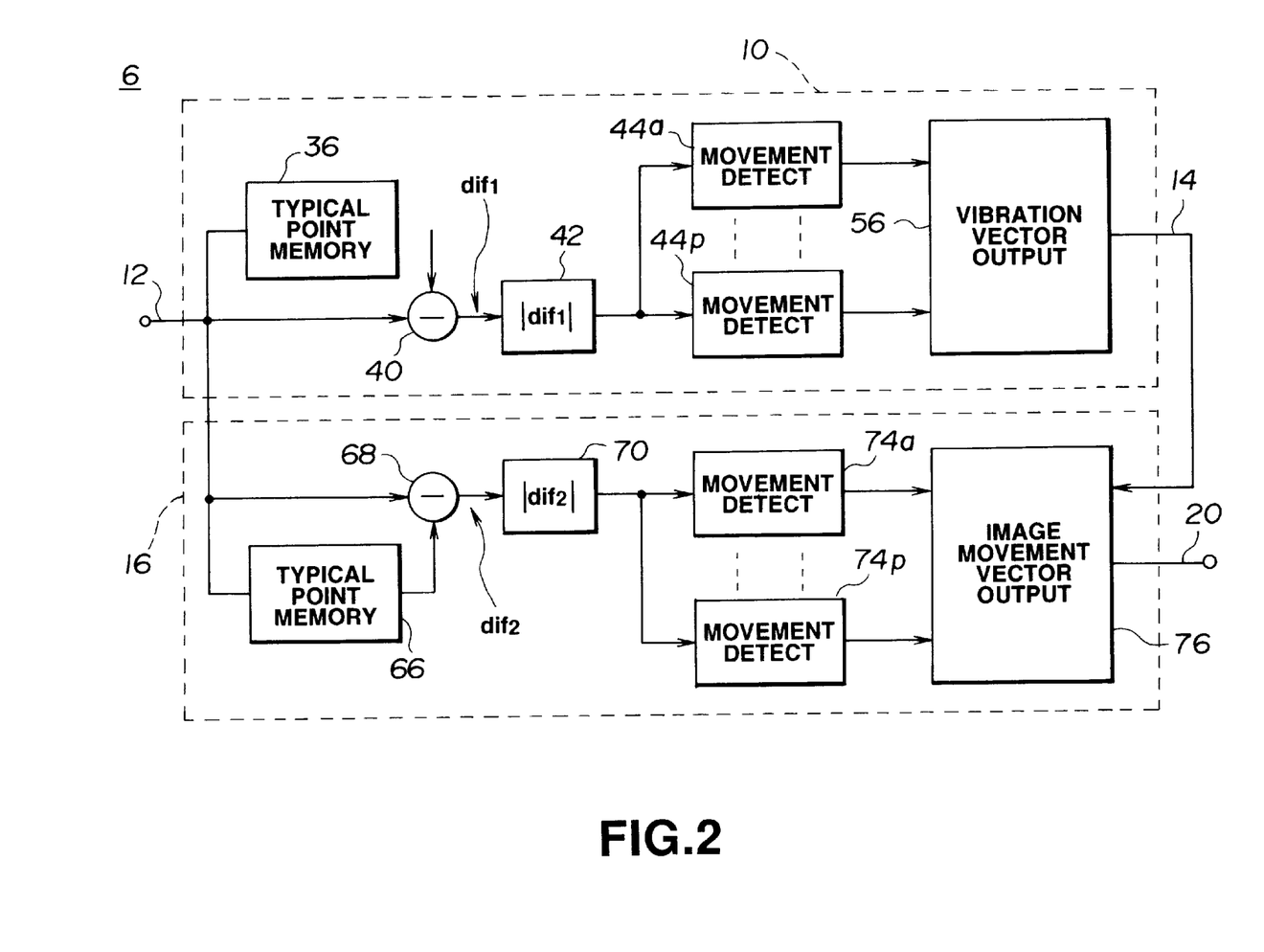
FIG. 2 is a block diagram of an image movement vector detection circuit of the FIG. 1 embodiment.

Referring also to FIG. 2, the image movement vector detector 6 is illustrated therein in greater detail. The image movement vector detector 6 includes a vibration vector detecting circuit 10 which is provided with the digitized image data at an input 12 and which serves to detect a vibration vector from the image data resulting from vibration of the video camera. The detected vibration vector is supplied at an output 14 of the circuit 10.

The image movement vector detector 6 also includes an image movement vector detection circuit 16 which receives both the image data from the input 12 as well as the vibration vector from the output 14 of the circuit 10 and serves to detect an image movement vector representing movement of an object within the image based on both the image data and the vibration vector. The circuit 16 supplies the image movement vector at an output 20 from which the image movement vector is supplied to the input 4a of the system controller 4 of FIG. 1.

Figure 3A:
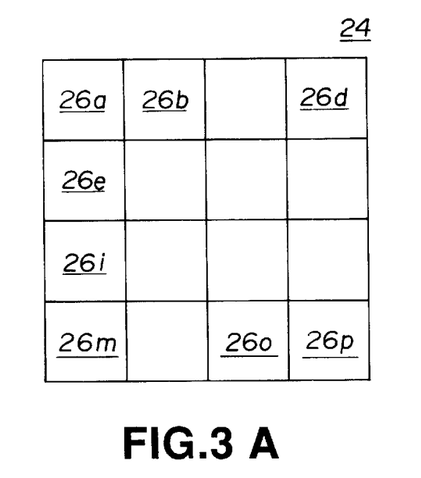
FIGS. 3A through 3D are schematic diagrams for use in explaining the operation of the image movement vector detection circuit of FIG. 2.
Figure 3B:
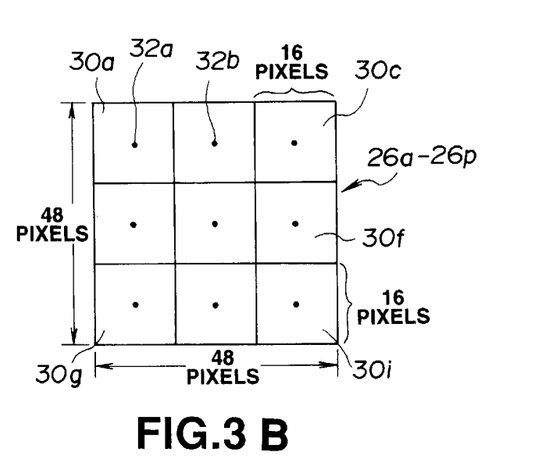

In order to detect the vibration vector, the vibration vector detection circuit 10 in effect divides the image data of each picture or frame into a plurality of macroblock areas which collectively include all of the pixels of the frame. With reference also to FIG. 3A an exemplary frame of image data 24 effectively is divided into 16 macroblock areas designated 26a through 26p. Each of the macroblock areas 26a through 26p, for example, may encompass a matrix of 48 by 48 pixels as illustrated in FIG. 3B. Each of the macroblock areas 26a through 26p in turn is divided into 16 by 16 pixel search areas 30a through 30i. A pixel position substantially at the center of each of the search areas 30a through 30i is regarded as a typical point 32a through 32i, respectively.

For each frame of the image signal, the vibration vector detection circuit 10 stores the luminance value at the corresponding one of typical points 32a through 32i in each search area 30a through 30i in each of the macroblock areas 26a through 26p in a typical point memory 36. During the following frame, as the luminance data is received by the vibration vector detection circuit 10, each pixel thereof is subtracted from the luminance value of the corresponding one of typical points 32a through 32i within the corresponding search area 30a through 30i of the respective macroblock area 26a through 26p by means of a subtracting circuit 40 to produce difference data $dif_1$ which, in turn, is supplied to the input of an absolute value detecting circuit 42 which serves to produce an output $|dif_1|$.

Figure 4:
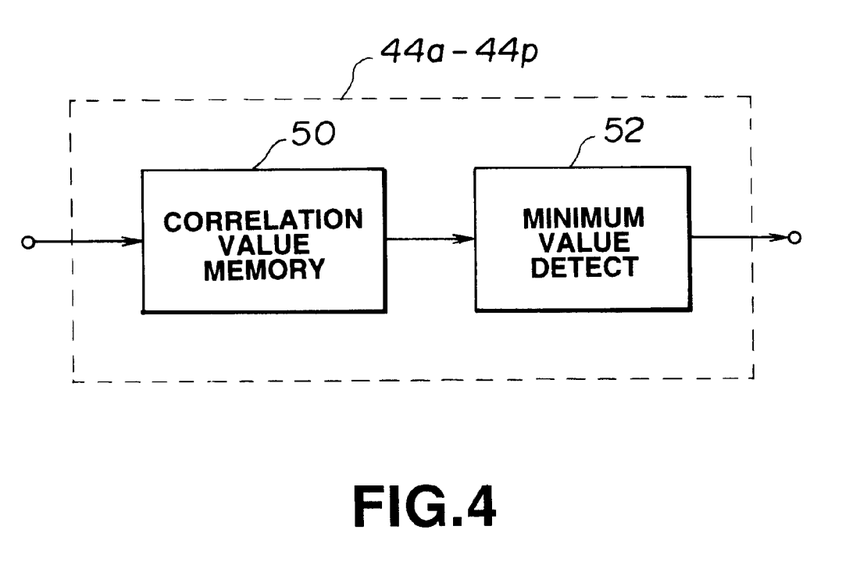
FIG. 4 is a block diagram of a macroblock movement detector circuit of the embodiment of FIG. 2.

The vibration vector detection circuit 10 includes 16 macroblock movement detection circuits 44a through 44p each of which accumulates absolute value difference data corresponding to one of the macroblock areas 26a through 26p. More particularly, for each respective position within the 16 by 16 pixel search areas of the respective macroblock area, each macroblock movement detection circuit 44a through 44p adds the nine absolute values of the difference data from all nine search areas 30a through 30i. That is, the absolute value of the difference data produced from the luminance value of the typical point 32a when subtracted from the luminance value of the upper left hand pixel within the search area 30a of the macroblock 26a is added to the absolute value of the difference between the luminance value of the typical point 32b and the upper left hand pixel of the search area 30b, as well as to the absolute value of the corresponding difference data produced for each of the remaining search areas 30c through 30i. The absolute values of such difference data are accumulated in a correlation value memory 50 of each macroblock movement detector circuit 44a through 44p, as illustrated in FIG. 4. Once all of the data has been accumulated in the correlation value memory 50, a minimum value detection circuit 52 of the corresponding macroblock movement detection circuit 44a through 44*p* detects the minimum accumulated value among the 16 by 16 stored values of the correlation value memory 50. The position of the minimum value data with respect to the typical point position as detected by the minimum value detection circuit 52 represents a macroblock movement vector from the preceding frame to the current frame.

Figure 5:
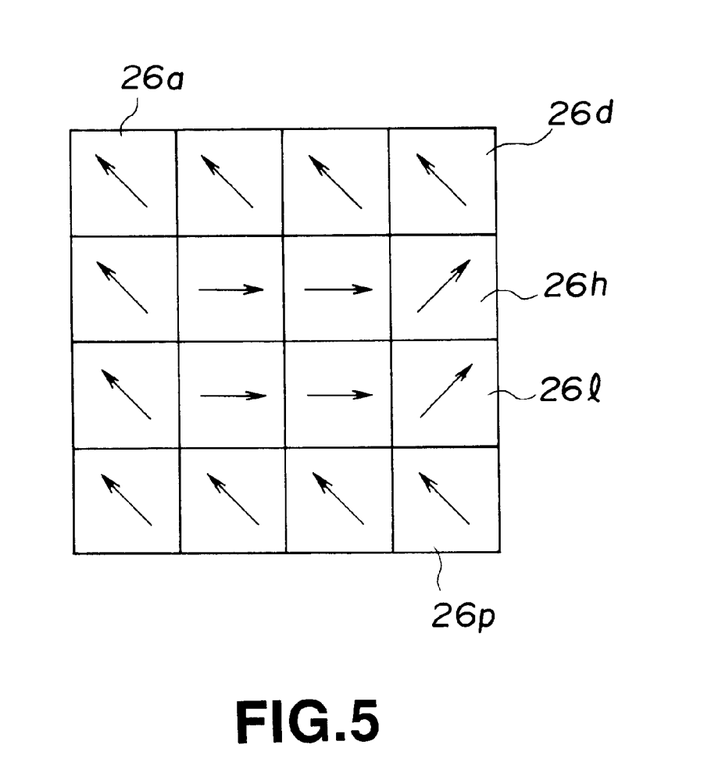
FIG. 5 is a schematic diagram for use in illustrating the operation of the vibration vector detection circuit of the FIG. 2 embodiment.

The macroblock movement vectors thus produced by the 16 macroblock movement detection output 44*a* through 44*p* are provided to a vibration vector output circuit 56 which serves to select a vibration vector for the current frame. With reference also to FIG. 5, the operation of the vibration vector output circuit 56 will be illustrated in connection therewith. FIG. 5 illustrates exemplary macroblock vectors as arrows within macroblock areas 26*a* through 26*p* corresponding with the macroblock areas in FIG. 3A. In the example of FIG. 5, it is seen that ten of the sixteen macroblock areas 26*a* through 26*e*, 26*i* and 26*m* through 26*p*, produce the same macroblock movement vector, while four of the macroblock areas at the center of the image produce a different corresponding vector and the macroblock areas 26*h* and 26*l* produce still another corresponding vector. The vibration vector output circuit 56 selects the most numerous macroblock movement vector as the vibration vector for the current frame. Accordingly, the vibration vector in the illustration of FIG. 5 would be that produced, for example, for macroblock area 26*a*. In the alternative, the vibration vector may be selected as a vector corresponding with two or more macro vectors which are substantially the same but represent movement in widely spaced macroblock areas.

Figure 3C:
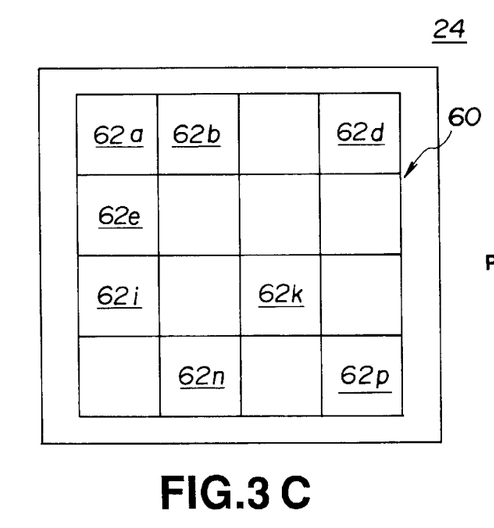

The image movement vector detection circuit 16, as noted above, also receives the image data from the input 12. The image movement vector detection circuit 16, in effect, operates on data within sixteen macroblock areas in the center of each frame. With reference also to FIG. 3C, a central portion 60 thereof is subdivided into macroblock areas 62*a* through 62*p*, each 36 by 36 pixels and subdivided into four search areas. The image movement vector detector 16 serves to produce a macroblock movement vector for each of the macroblock areas 62*a* through 62*p* in the same fashion as the vibration vector detector 10 produces macroblock movement vectors for the macroblock areas 26*a* through 26*p*.

Figure 3D:
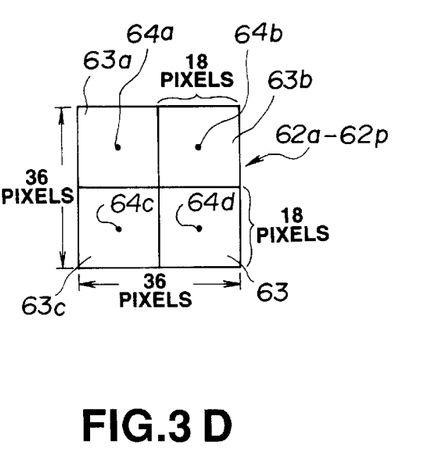

More specifically, and with reference also to FIG. 3D, the image movement vector detector 16 includes a typical point memory 66 which stores typical point data 64*a* through 64*d* from a next preceding frame for each of four equally dimensioned search areas 63*a* through 63*d* in each of the sixteen macroblock areas 62*a* through 62*d* and subtracts the typical point data from corresponding search area data of the current data frame by means of a subtracting circuit 68 to produce difference data $dif_2$ which it supplies to absolute value circuit 70 which, in turn, produces the absolute value thereof $|dif_2|$. Each of the absolute value data produced by the circuit 70 is supplied to a respective one of sixteen macroblock movement detector circuits 74*a* through 74*p* each of which serves to produce a macroblock movement vector for the corresponding one of macroblock areas 62*a* through 62*p* in the same fashion as macroblock movement detector circuits 44*a* through 44*p* produced macroblock movement vectors for the macroblock areas 26*a* through 26*p* of FIG. 3A. Since image movement vectors usually are greater in magnitude than vibration vectors, relatively larger search areas (18×18 pixels) are employed by the circuit 16 than are used by the circuit 10 (16×16 pixels).

The macroblock movement vectors thus produced by the circuits 74*a* through 74*p* are supplied to an image movement vector output circuit 76 which is also supplied with the vibration vector from the output 14 of the vibration vector detector 10. The image movement vector output circuit 76 compares the macroblock movement vectors provided by the circuits 74*a* through 74*p* to the vibration vector received from the vibration vector detector 10 and disqualifies any of the macroblock movement vectors which correspond to the vibration vector. Then the circuit 76 determines the image movement vector corresponding with the most numerous ones of the remaining macroblock movement vectors received from the circuits 74*a* through 74*p*. Then the image movement vector output circuit 76 outputs the selected image movement vector from the output 20 to the input 4*a* of the system controller 4.

In an alternative embodiment of the image movement vector output circuit 76, the alternative embodiment also disqualifies any macroblock movement vectors corresponding with the vibration vector, but then produces an image movement vector which is an average of the remaining macroblock movement vectors. In still another embodiment of an image movement vector output circuit, while macroblock movement vectors corresponding with the detected vibration vector are disqualified, any other macroblock movement vectors which are very different from the most numerous macroblock movement vector are also disqualified. Then the remaining macroblock movement vectors are averaged to produce the image movement vector. To determine whether a given macroblock movement vector is very different from the most numerous macroblock movement vector, it is determined whether the difference therebetween exceeds a predetermined threshold. The technique carried out by this further embodiment provides the ability to distinguish motion of another object in the background from the object which the user intends to image.

While the embodiment of FIG. 2 compares data of successive frames to produce an image movement vector, it will be appreciated that in the alternative the data of a current field may be compared to data of a preceding field.

Figure 6:
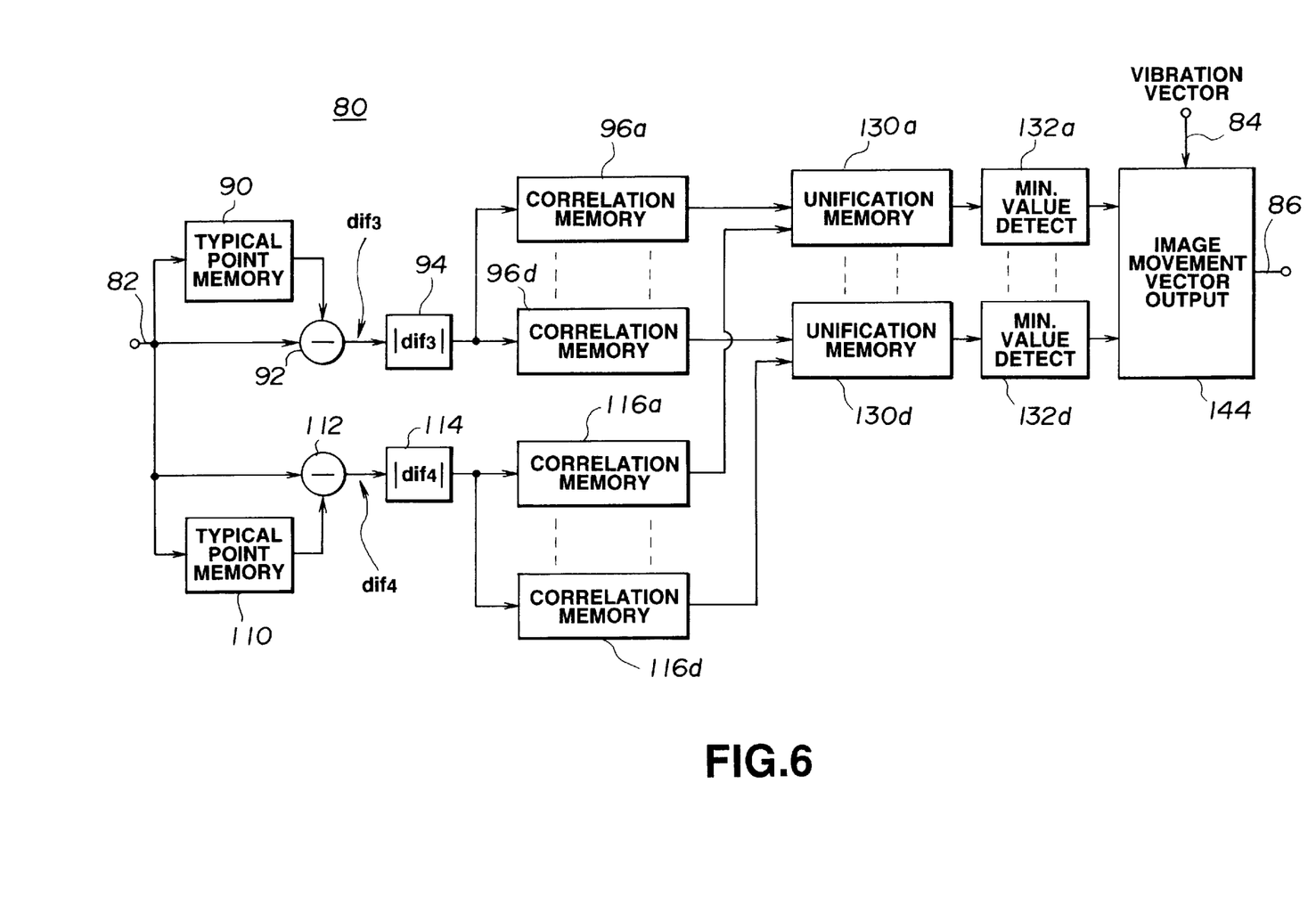
FIG. 6 is a block diagram of an image movement vector detection circuit in accordance with a further embodiment of the present invention.

Referring now to FIG. 6, still another embodiment of an image movement vector detector 80 is illustrated therein. Image movement vector detector 80 receives luminance data at an input 82 and a detected vibration vector at an input 84 and serves to produce an image movement vector based upon both the input luminance data and the input vibration vector which it then supplies at an output 86.

Figure 7A:
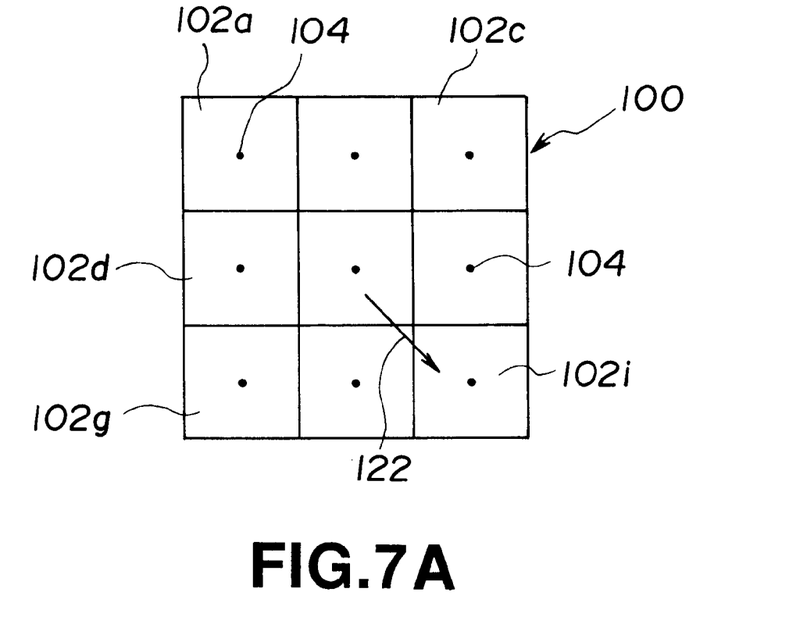
FIGS. 7A and 7B are schematic diagrams for use in explaining the operation of the embodiment of FIG. 6.

An upper branch of the image movement vector detector 80 including a typical point memory 90, a subtracting circuit 92, an absolute value circuit 94, and four correlation memory circuits 96*a* through 96*d*, produce macroblock movement vectors for four macroblock areas centered in an image utilizing nine search areas covering the entire area of each macroblock. As shown in FIG. 7A, a typical macroblock area 100 as processed by the upper branch of the detector 80 is divided into nine search areas 102*a* through 102*i*. The typical point memory 90 stores typical point data from the preceding frame corresponding with pixel positions 104 of each of the search areas 102*a* through 102*i*. The subtracting circuit 92 subtracts the typical point data for each search area from each of the pixel values of the current frame therein and supplies the difference data thus produced, $dif_3$, to the absolute value circuit 94 which produces the absolute value thereof $|dif_3|$ which it, in turn, supplies to the appropriate one of the correlation memories 96*a* through 96*d* storing absolute value difference data of the corresponding macroblock area.

A lower branch of the detector 80 includes a further typical point memory 110, a subtracting circuit 112, an absolute value circuit 114, and four correlation memories 116a through 116d. The lower branch of the detector 80 processes data of the same macroblock areas as processed by the upper branch, but using different search areas. More specifically, with reference to FIG. 7B, the lower branch of the detector 80 processes macroblock data within four search areas 120a through 120d centered in the macroblock area 100. Each of the search areas 120a through 120d has the same size and shape as the search areas 102a through 102i, so that each of the search areas 120a through 120d includes pixels within four of the search areas 102a through 102i. By using overlapping search areas, such as those illustrated in FIGS. 7A and 7B, motion within a given macroblock area 100 beginning, for example, in the search area 102e of FIG. 7A and ending in search area 102i thereof, as indicated by the vector 122, which would be detected incorrectly with the use of the search areas of FIG. 7A, can be detected correctly in processing the data from search area 120d of FIG. 7B. Incidentally, search areas 102a through 102i and 120a through 120d are relatively larger than the search areas used for vibration vector detection by the circuit 10, since vibration vectors typically are much smaller in magnitude than image movement vectors.

Figure 7B:
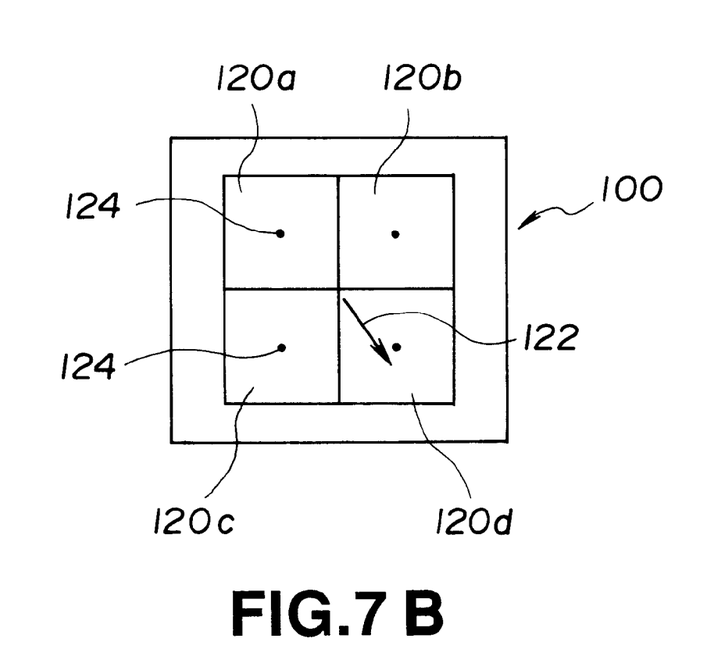

The lower branch of the detector 80 stores typical point data from the next preceding frame corresponding with pixel positions 124 in FIG. 7B for each of the four search areas 120a through 120d in each of the four macroblock areas in the further typical point memory 110. As pixel data corresponding with the search areas 120a through 120d of the four macroblock area is received at the input 82, the subtracting circuit 112 subtracts the appropriate typical point data from the input image data to produce data $dif_4$. The absolute value circuit 114 produces the absolute value of the difference data, $|dif_4|$, which it then supplies to the appropriate one of the correlation memories 116a through 116d depending on the macroblock area to which the difference data corresponds. The correlation memories 116a through 166d operate in the same fashion as the correlation memories 96a through 96d to accumulate difference data of corresponding pixel positions within each of the search areas 120a through 120d of the respective macroblock area.

Each correlation memory 96a through 96d and 116a through 116d outputs its accumulated difference data to a respective one of four unification memories 130a through 130d. Each unification memory 130a through 130d accumulates the difference data of corresponding locations of the thirteen search areas 102a through 102i and 120a through 120d of a respective macroblock area. Each unification memory 130a through 130d outputs its accumulated difference data through a respective one of four minimum value detection circuits 132a through 132d which selects the position having the minimum accumulated difference data in order to produce a macroblock movement vector for the corresponding macroblock. It will be seen that, by adding the difference data from search areas 120a through 120d to the difference data from areas 102a through 102i, the unification memories serve to reduce the effects of noise by averaging a larger amount of data than the correlation memories.

Figure 8:
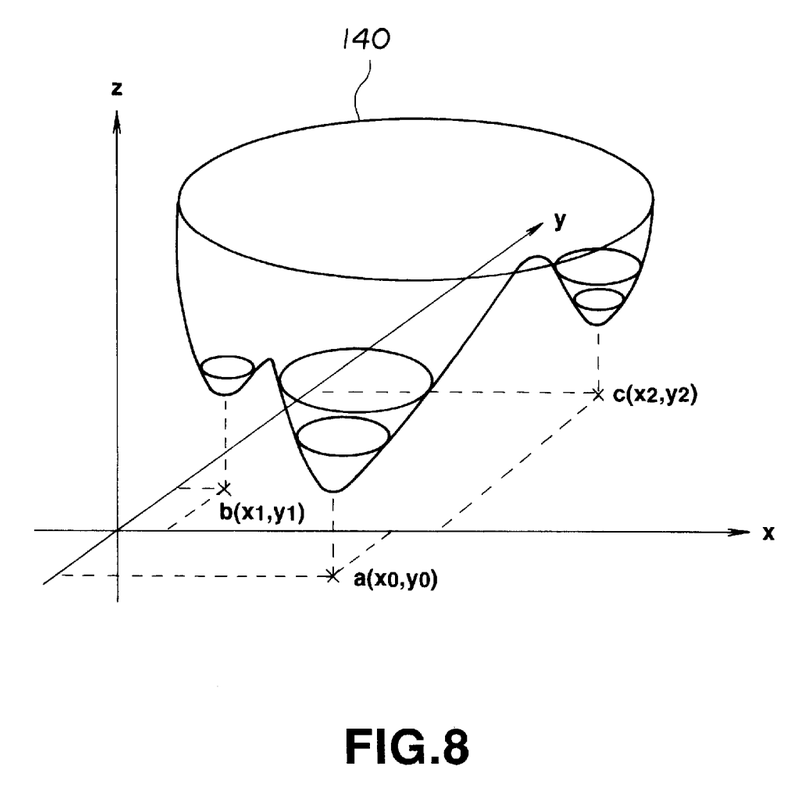
FIG. 8 is a diagram for use in explaining the operation of the embodiment of FIG. 6.

The operation of the minimum value detection circuits 132a through 132d is illustrated graphically in FIG. 8 wherein a correlation surface 140 represents exemplary accumulated difference data supplied by one of the unification memories 130a through 130d for an exemplary macroblock area. More specifically, in FIG. 8, x and y axes represent pixel positions $(x_i, y_i)$ within each search area, while a z axis represents the accumulated difference data, or correlation value, at each search area pixel position. For example, the correlation value at point b represents the accumulated difference data at a pixel position $(x_1, y_1)$ of each search area of a corresponding macroblock. As seen in FIG. 8, local minima of the correlation values occur at positions b and c of the search area pixel positions, but an absolute minimum of the correlation values for that macroblock area occurs at point a. Accordingly, the corresponding one of the minimum value detection circuits 132a through 132d provided with the data as represented in FIG. 8 will output a macroblock movement vector corresponding with the pixel position a with respect to the typical point position. The correlation value minima at points b and c can represent, for example, the movement of objects in the background which the minimum value detection circuit thus ignores.

Each of the minimum value detection circuits 132a through 132d supplies its macroblock movement vector to an image movement vector output circuit 144 which is also supplied with the vibration vector at the input 84. The image movement vector output circuit 144 serves to select the image movement vector from among the vectors supplied by the circuits 132a through 132d with the use of the vibration vector utilizing any of the techniques therefor described above. The image movement vector output circuit 144 outputs the selected image movement vector to the output 86 of the image movement vector detector 80.

While the embodiment of FIG. 6 compares data of successive frames to produce an image movement vector, it will be appreciated that in the alternative the data of a current field may be compared to data of a preceding field.

Figure 9:
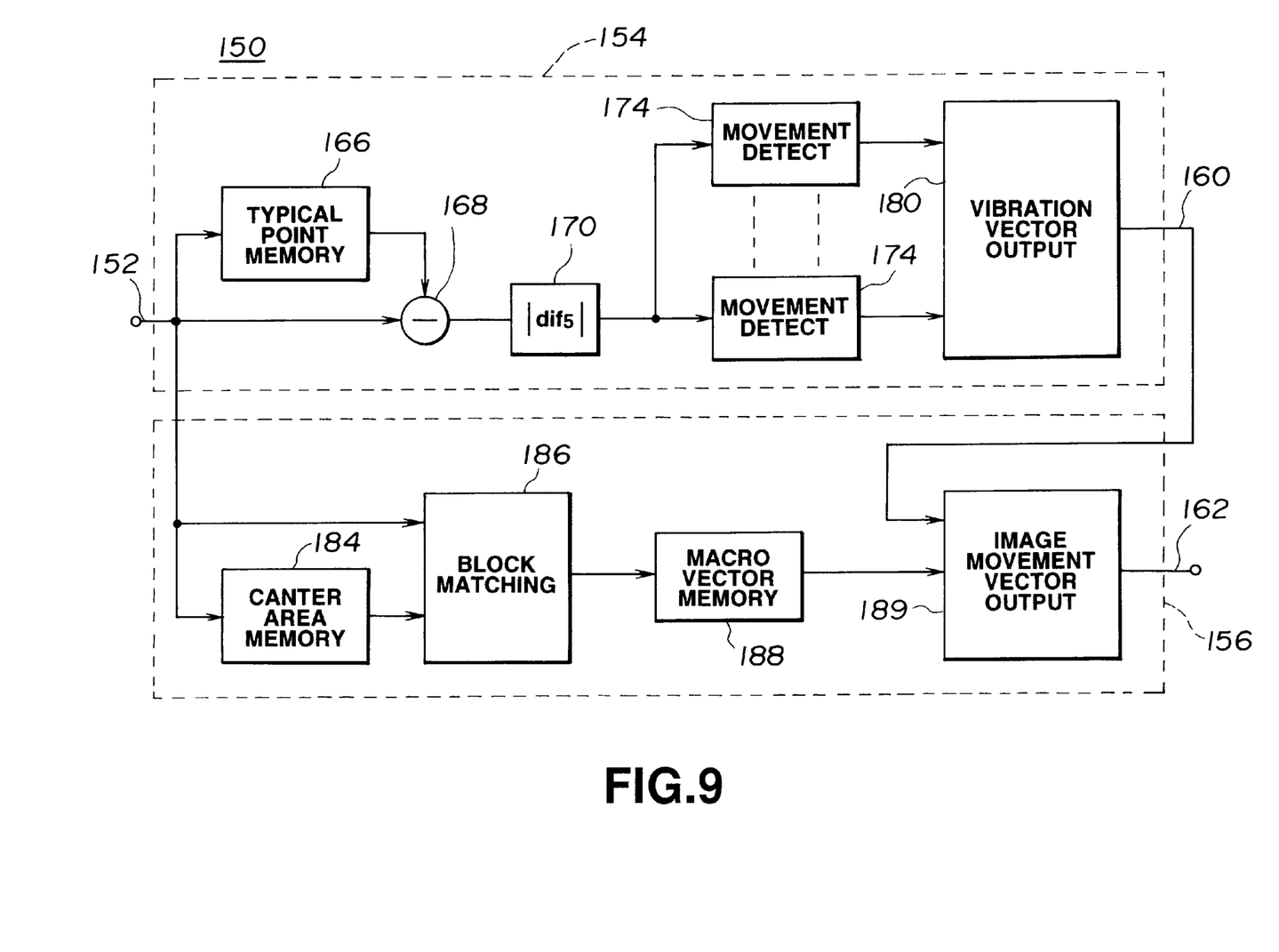
FIG. 9 is a block diagram of a further embodiment of an image movement vector detection circuit in accordance with the present invention.

FIG. 9 illustrates a further embodiment of an image movement vector detector 150 having an input 152 for receiving image data which is supplied therefrom both to a vibration vector detection circuit 154 and an image movement vector detection circuit 156. As in the case of prior embodiments, the vibration vector detection circuit 154 detects a vibration vector within a given frame of an image signal and supplies the detected vibration vector at an output 160 coupled with an input of the image movement vector detection circuit 156. The image movement vector detection circuit 156 detects an image movement vector based upon both the image data received at the input terminal 152 and the vibration vector, and supplies the detected image movement vector at an output 162 of the image movement vector detector 150.

Unlike the previously described embodiments, the vibration vector detection circuit 154 processes image data only from macroblock areas positioned in the periphery of each frame surrounding a central area thereof. Accordingly, a typical point memory 166 stores typical point data from the preceding frame but only for peripheral macroblock areas. A subtracting circuit 168 serves to produce difference data $dif_5$ for each of a plurality of search areas within each of the peripheral macroblock areas based upon the data stored in a typical point memory 166 and supplies the difference data to an absolute value circuit 170 which outputs the absolute value of the received difference data to one of a plurality of macroblock movement vector detectors 174 each of which accumulates the difference data for a respective macroblock for corresponding pixel locations within the various search areas, and outputs a macroblock movement vector for the corresponding macroblock area to a vibration vector output circuit 180. The circuit 180 produces a vibration vector based on the macroblock movement vector supplied thereto from the macroblock detection circuit 174 and supplies the detected vibration vector at the output 160. Either data of a current frame may be compared to data of a preceding frame to produce the vibration vector, or else the data of a current field may be compared to that of a preceding field for this purpose. Moreover, the vibration vector detector 10 of FIG. 2 may be substituted for the vibration vector detector 150 in the FIG. 9 embodiment.

Figure 10:
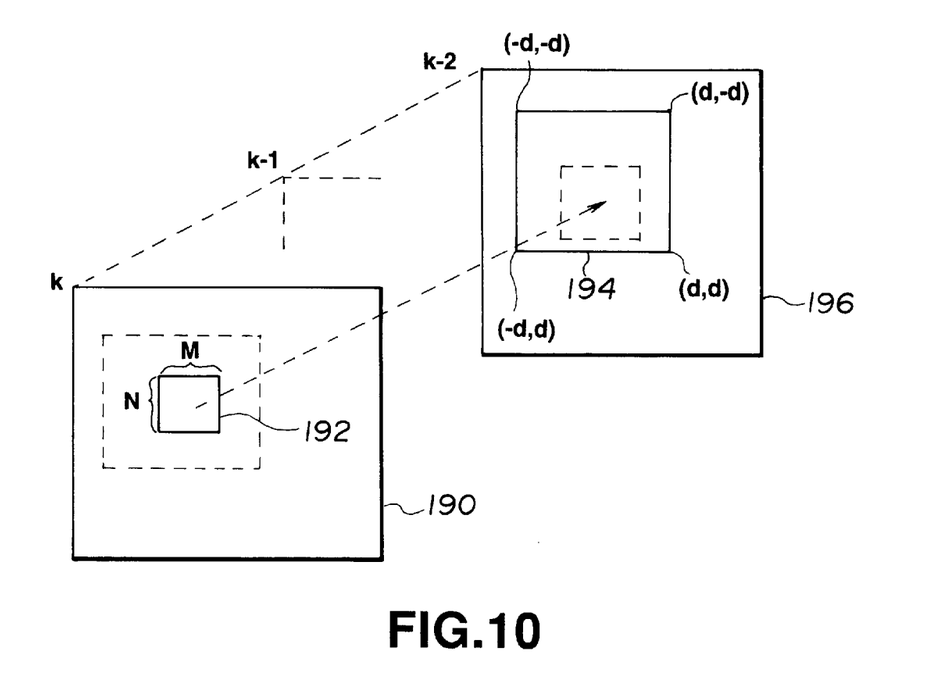
FIG. 10 is a diagram for use in explaining the operation of the embodiment of FIG. 9.

The image movement vector detection circuit 156 includes a center area memory 184 which stores pixel data for the center area of the field occurring two field intervals prior to the current field of the image data. The preceding field picture data stored in the center area memory 184 is supplied to a block matching circuit 186 which is also supplied with current field data received at the input 152. The block matching circuit 186 carries out a block matching process for each of a plurality of macroblock areas within the center area of the current field. With reference also to FIG. 10, the block matching process carried out by the circuit 186 for an exemplary macroblock area 190 of a current field k is illustrated therein. A search block 192 within the macroblock area 190 is selected including M pixels in the horizontal direction by N pixels in the vertical direction. The search block 192 is matched with a search area 194 of a corresponding macroblock area 196 within the field k-2 whose data is stored at that time in the center area memory 184.

The search area 194 is relatively larger than the area of the search block 192 and is bounded at an upper edge by a portion of a horizontal line of pixels extending from pixel position (−d, −d) to pixel position (d, −d). The search area 194 is bounded at a lower edge by a line extending from the pixel position (−d, d) to pixel position (d, d). In effect, the block matching circuit 186 matches the data from the search block 192 sequentially with subsets of the data within the search area 194 beginning at a first position at which the upper left hand pixel of the search block 192 is matched with the pixel position (−d, −d) of the search area 194 and the remaining pixel positions of the search block 192 are matched with corresponding positions of the search area 194. The absolute values of the differences between the matched pixels of the search block 192 and the search area 194 are then accumulated. Then the pixel data of the search block 192 is matched with a further subset of the pixel data within the search area 194 by matching the upper left hand pixel thereof with the pixel position (1−d, −d) and the same process is carried out. This process is carried out repeatedly by shifting the search block 192 one pixel position to the right until its upper right hand pixel is matched with the pixel of the search area 194 at position (d, −d). In this manner, absolute values of difference data are accumulated separately by matching the data of the search block 192 with successive subsets of the search area 194 data by aligning its upper left hand pixel successively with each of the points (−d, −d) through (d−M, −d). This process is repeated for each line of pixel data within the search area 194 until the lower right hand pixel of the search block 192 has been matched with the pixel data of the search area 194 at position (d, d).

At each match position of the search block with data of the search area 194, an evaluation function is carried out as follows, wherein the center position of the search block 192 as displaced from the center of the search area 194 is indicated (i, j), the luminance value of each search block pixel at position (m, n) within the search block 192 is indicated as $s_k$ (m, n) and the luminance value of the search area pixel to which it is matched is indicated as $s_{k-2}$ (m+i, n+j):

$$E(i, j) = \frac{1}{MN} \sum_{m=1}^{M} \sum_{n=1}^{N} |s_k(m, n) - s_{k-2}(m + i, n + j)|$$

The block matching circuit 186 carries out the evaluation function for each position (i, j) of the search area 194 and selects the macroblock movement vector for each macroblock as the position (i, j) at which the evaluation function E has a minimum value.

The block matching circuit 186 applies the macroblock vectors thus detected to a macro vector memory 188 for storage therein. An image movement vector output circuit 189 is supplied both with the vibration vector from the output 160 of the vibration vector detector 154 and the macro vectors stored in the memory 188 and serves to select an image movement vector utilizing any of the techniques described above for image movement vector detection which it then supplies at the output 162 of the image movement vector detector 150.

Since the image movement vector detection circuit 156 implements a block matching technique, instead of one of the typical point matching techniques employed in the embodiments of FIGS. 2 and 6, the circuit 156 provides relatively higher accuracy and is used in applications for which such accuracy is essential. However, the circuit 156 is relatively more complex than the corresponding circuits of FIGS. 2 and 6.

Although the circuit 156 carries out block matching on interlaced image signals, it will be appreciated from the disclosure herein that the circuit 156 may be adapted with appropriate modifications to carry out block matching on non-interlaced image signals.

In the case of each embodiment of an image movement vector detector 6, 80 and 150 as described above, memory writing and reading, as well as data processing by the various elements thereof are carried out under the control of the system controller 4.

Figure 11:
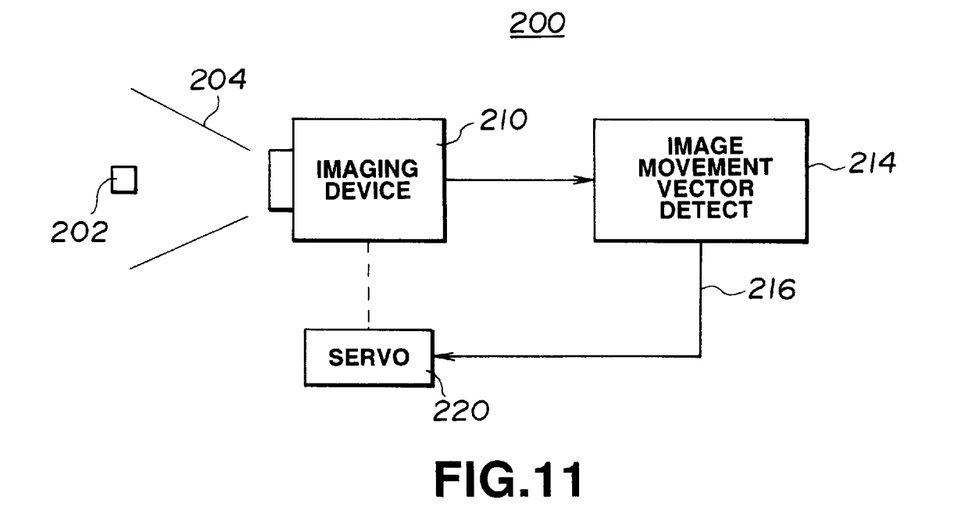
FIG. 11 is a block diagram of a video camera for tracking a moving object imaged thereby in accordance with a further embodiment of the present invention.

With reference now to FIG. 11, a video camera 200 is illustrated therein for tracking a moving object 202 within a field of view 204 thereof. The video camera includes an imaging device 210 which produces an image signal representing the object 202 which it supplies to an image movement vector detector 214 which may be, for example, any of the image movement vector detectors described hereinabove. The image movement vector detector 214 serves to produce an image movement vector at an output 216 thereof representing movement of the object 202 within the field of view 204. A camera position servo 220 is supplied with the image movement vector from the output 216 as an error signal and serves to adjust the position of the imaging device 210 to track the object 202 in response to the image movement vector.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. An image movement vector detection apparatus for detecting an image movement vector from an image signal produced by a video camera, the image movement vector representing movement of an object within an image represented by the image signal, comprising:

vibration vector detecting means for detecting a vibration vector from the image signal resulting from vibration of the video camera; and image movement vector detecting means for detecting an image movement vector representing movement of an object within an image represented by the image signal based on both the image signal and the vibration vector.

2. The image movement vector detection apparatus of claim 1, wherein the vibration vector detecting means is operative to detect the vibration vector from an image signal representing substantially the entire image area of a picture, and wherein said image movement vector detecting means is operative to detect the image movement vector based on a portion of said image signal representing a central part of the picture.

3. The image movement vector detection apparatus of claim 1, wherein the vibration vector detecting means comprises a plurality of macro vector detection means each for detecting a macro vector representing movement of an image in an associated macroblock area corresponding with a portion only of the picture and vibration vector producing means for producing the vibration vector based on the macro vectors produced by the plurality of macro vector detection means.

4. The image movement vector detection apparatus of claim 1, wherein the image movement vector detecting means includes a plurality of macro vector detecting means each for detecting a macro vector representing movement of an image in an associated macroblock area including a portion only of the picture, and image movement vector producing means for producing the image movement vector based on the macro vectors produced by the macro vector detecting means and the vibration vector.

5. The image movement vector detection apparatus of claim 4, wherein the image movement vector producing means is operative to produce the image movement vector based on the macro vectors with the exclusion of any thereof which is substantially the same as the vibration vector.

6. The image movement vector detection apparatus of claim 4, wherein the image movement vector detecting means is operative to produce the image movement vector as a vector corresponding with the most commonly occurring macro vector among those produced by the macro vector detecting means.

7. The image movement vector detection apparatus of claim 4, wherein the image movement vector detecting means is operative to produce the image movement vector as an average vector of those of the macro vectors which do not substantially correspond with the vibration vector.

8. The image movement vector detection apparatus of claim 4, wherein the image movement vector detecting means is operative to produce the image movement vector as an average vector of the macro vectors excluding any thereof differing from the most commonly occurring values of the macro vectors by an amount exceeding a predetermined threshold.

9. The image movement vector detection apparatus of claim 1, wherein the vibration vector detecting means comprises typical point memory means for storing typical point values of one of a frame and a field preceding a respective one of a current frame and a field of the image signal, means for producing difference data for each of a plurality of search areas within a plurality of macroblock areas of the respective one of the current frame and field by subtracting typical point data stored in the typical point memory means from data of corresponding search areas of the respective one of the current frame and field, means for producing a macro vector for each of the macroblock areas based on difference data of corresponding search areas and means for producing the vibration vector based on the detected macro vectors.

10. The image movement vector detection apparatus of claim 1, wherein the image movement vector detecting means comprises typical point memory means for storing typical point values of one of a frame and a field preceding a respective one of a current frame and a field of the image signal, means for producing difference data for each of a plurality of search areas within a plurality of macroblock areas of the respective one of the current frame and field, means for producing a macro vector for each of the macroblock areas and means for producing the image movement vector based on the detected macro vectors and the vibration vector.

11. The image movement vector detection apparatus of claim 10, wherein each of the macro vector detecting means is each operative to store difference data from overlapping search areas.

12. The image movement vector detection apparatus of claim 1, wherein the vibration vector detecting means is operative to detect the vibration vector based on portions of the image signal included in two successive ones of frames and fields thereof.

13. The image movement vector detection apparatus of claim 1, wherein the image movement vector detecting means is operative to detect the image movement vector based on portions of the image signal in two successive ones of frames and fields thereof.

14. The image movement vector detection apparatus of claim 1, wherein the vibration vector detecting means is operative to detect the vibration vector from a first portion of the image signal and the image movement vector detecting means is operative to detect the image movement vector from a second portion of the image signal differing at least in part from the first portion thereof.

15. The image movement vector detection apparatus of claim 14, wherein the first portion of the image signal overlaps with the second portion thereof.

16. The image movement vector detection apparatus of claim 14, wherein the vibration vector detecting means is operative to produce the vibration vector based on a first portion of the image signal representing a periphery of one of a frame and field thereof, and the image movement vector detecting means is operative to produce the image movement vector based on a second portion of the image signal representing a central area of said one of a frame and field thereof.

17. The image movement vector detection apparatus of claim 1, wherein the image movement vector detecting means is operative to detect the image movement vector based on block matching of a portion of a current frame with a portion of a preceding frame.

18. The image movement vector detection apparatus of claim 1, wherein the vibration vector detecting means and the image movement vector detecting means is operative to produce said vibration vector and said image movement vector, respectively, from a plurality of macro vectors each representing movement within a respective macroblock area and produced from correlation data representing differences between a plurality of typical point pixels of a preceding frame or field of the image signal and pixels of respective search areas of said respective macroblock areas, the search areas employed for producing said image movement vector encompassing relatively greater numbers of pixels than the search areas employed for producing said vibration vector.

19. A video camera for producing an image signal in response to a light image received thereby, comprising:

imaging means for producing an image signal from a light image by exposing the imaging means to the light image for a selectable exposure time;

vibration vector detecting means for detecting a vibration vector from the image signal resulting from vibration of the video camera;

image movement vector detecting means for detecting an image movement vector representing movement of an object within an image represented by the image signal based on both the image signal and the vibration vector; and exposure time control means for setting the selectable exposure time of the imaging means based on the image movement vector.

20. The video camera of claim 19, wherein the imaging means comprises a charge coupled device.

21. The video camera of claim 19, wherein the charged coupled device is operative to select an exposure time therefor based on an electronic shutter input signal supplied thereto, and wherein the exposure time control means is operative to supply the electronic shutter input signal to said charge coupled device for selecting the exposure time thereof based on the image movement vector.

22. The video camera of claim 19, wherein the exposure time control means is operative to set the selectable exposure time based on a magnitude of the image movement vector.

23. A video camera for tracking a moving object imaged thereby, comprising:

imaging means for producing an image signal from a light image;

vibration vector detecting means for detecting a vibration vector from the image signal resulting from vibration of the video camera;

image movement vector detecting means for detecting an image movement vector representing movement of a moving object within an image represented by the image signal based on both the image signal and the vibration vector; and servo means responsive to the image movement vector for adjusting a position of the video camera to track the moving object based on the image movement vector.

* * * * *